United States Patent
Nardelli et al.

(10) Patent No.: US 10,454,153 B2
(45) Date of Patent: Oct. 22, 2019

(54) SELF ADJUSTING ANTENNA IMPEDANCE FOR CREDENTIAL DETECTION IN AN ACCESS CONTROL SYSTEM

(71) Applicant: Schlage Lock Company LLC, Carmel, IN (US)

(72) Inventors: Frank A. Nardelli, Indianapolis, IN (US); Michael Reuter, Carmel, IN (US); William B. Ainley, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 16/364,844

(22) Filed: Mar. 26, 2019

(65) Prior Publication Data

US 2019/0221915 A1    Jul. 18, 2019

Related U.S. Application Data

(63) Continuation of application No. 15/246,945, filed on Aug. 25, 2016, now Pat. No. 10,243,254.

(51) Int. Cl.
*H01Q 1/22* (2006.01)
*H04W 76/27* (2018.01)
*H04B 5/00* (2006.01)

(52) U.S. Cl.
CPC ......... *H01Q 1/2216* (2013.01); *H04B 5/0056* (2013.01); *H04W 76/27* (2018.02)

(58) Field of Classification Search
CPC ............ H01Q 1/22; H04W 76/27; H04B 5/00
USPC ....................................................... 343/720
See application file for complete search history.

(56) References Cited

U.S. PATENT DOCUMENTS

| | | | |
|---|---|---|---|
| 7,439,860 B2 | 10/2008 | Andresky | |
| 8,219,053 B2 * | 7/2012 | Mejia | G06K 7/0008 455/114.1 |
| 8,836,512 B2 | 9/2014 | Shanks | |
| 9,294,157 B2 | 3/2016 | Lu et al. | |

(Continued)

OTHER PUBLICATIONS

International Search Report; International Searching Authority; US Patent and Trademark Office; International Application No. PCT/US2017/048548; dated Nov. 20, 2017; 2 pages.

(Continued)

*Primary Examiner* — Andrea Lindgren Baltzell
(74) *Attorney, Agent, or Firm* — Taft Stettinius & Hollister LLP

(57) ABSTRACT

An access control device including a credential reader circuit structured to enter a standby mode, awaken from the standby mode, and receive data from a nearby credential, and a credential detection circuit. The credential detection circuit includes a memory configured to store program instructions, an antenna circuit, and a processor electrically coupled to the antenna circuit and to the credential reader circuit, wherein the processor configured to execute the stored program instructions to: transmit an energizing signal; receive a modulated energizing signal with the antenna circuit; transmit an activation signal to the credential reader circuit in response to the received modulated energizing signal, wherein the received modulated energizing signal includes I and Q values; receive a false detection signal from the credential reader circuit; and adjust an impedance of the antenna circuit.

20 Claims, 6 Drawing Sheets

(56) References Cited

U.S. PATENT DOCUMENTS

| | | |
|---|---|---|
| 2005/0087599 A1 | 4/2005 | Ward et al. |
| 2006/0186995 A1* | 8/2006 | Wu .................... G06K 7/0008 340/10.1 |
| 2006/0267735 A1 | 11/2006 | Ovard et al. |
| 2007/0252702 A1 | 11/2007 | Wulff et al. |
| 2008/0106381 A1 | 5/2008 | Adamec et al. |
| 2012/0329389 A1 | 12/2012 | Royston et al. |
| 2016/0112028 A1* | 4/2016 | Baier .................... H01L 23/495 343/861 |
| 2016/0217645 A1 | 7/2016 | Seitz et al. |

OTHER PUBLICATIONS

Written Opinion; International Searching Authority; US Patent and Trademark Office; International Application No. PCT/US2017/048548; dated Nov. 20, 2017; 6 pages.

\* cited by examiner

SELF ADJUSTING ANTENNA IMPEDANCE FOR CREDENTIAL DETECTION IN AN ACCESS CONTROL SYSTEM

CROSS REFERENCE TO RELATED APPLICATIONS

This application is a continuation of U.S. patent application Ser. No. 15/246,945 filed Aug. 25, 2016 and issued as U.S. Pat. No. 10,243,254, the contents of which are incorporated herein by reference in their entirety.

FIELD OF THE INVENTION

The present disclosure relates to an access control device, and more particularly to a credential reader system.

BACKGROUND

Present credential readers suffer from a variety of limitations including high power consumption, reduced credential detection range, and a high false credential detection rate. For example, certain credential detectors of credential readers are not calibrated after a series of false credential detects which can be caused by environmental factors such as a change in temperature. Other factors contributing to false credential detections include variations in component values, changes to component values over time, and variation in credential reader design. In the case where the credential readers are incorporated as part of an electronic door lock, variations in lock hardware including variations in escutcheon design can also contribute to false detects. In another example, certain credential detectors are calibrated by unnecessarily increasing the range of allowable impedance values, thereby desensitizing the detector, causing the effective range of the credential detector to be significantly reduced. Therefore, a need exists for further technological developments in the area of credential detectors.

SUMMARY

Exemplary embodiments include unique credential readers systems, detector systems, methods, techniques and apparatuses for access control systems. Further embodiments, forms, objects, features, advantages, aspects and benefits of the disclosure shall become apparent from the following description and drawings.

In one embodiment, there is provided a method of detecting the presence of a credential with a credential reader, the credential reader including an antenna circuit having an antenna to transmit and to receive a signal. The method includes: transmitting an energizing signal with the antenna; receiving a modified energizing signal with the antenna; demodulating the received modified energizing signal to determine an I value and a Q value of the received modified energizing signal; and adjusting a component of the antenna circuit as a function of one of the I value and the Q value.

In another embodiment, there is provided an access control device including a credential reader and detection circuit structured to enter a standby mode, awaken from the standby mode, and receive data from a credential. The credential reader and detection circuit includes a memory configured to store program instructions, an antenna circuit, and a processor electrically coupled to the antenna circuit. The processor is configured to execute the stored program instructions to: transmit an energizing signal; receive a modulated energizing signal; transmit an interrupt signal in response to the received modulated energizing signal, wherein the received modulated energizing signal has I and Q values; receive a false detection signal; and adjust an impedance of the antenna circuit in response to the received false detection signal.

DETAILED DESCRIPTION

Figure 1B:
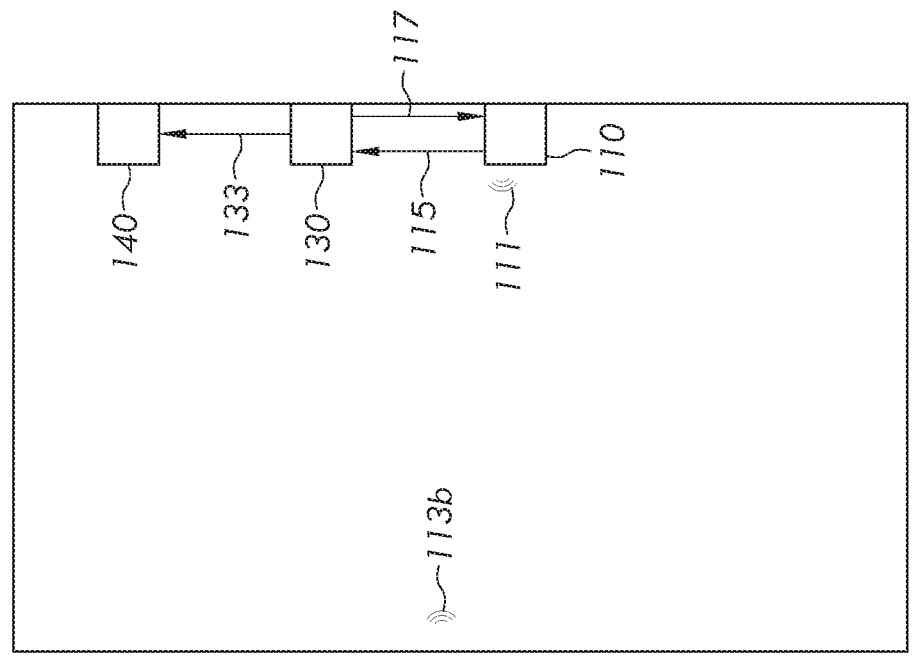
FIGS. 1*a-b* illustrate an exemplary access control system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein, are contemplated as would normally occur to one skilled in the art to which the invention relates.

Figure 1A:
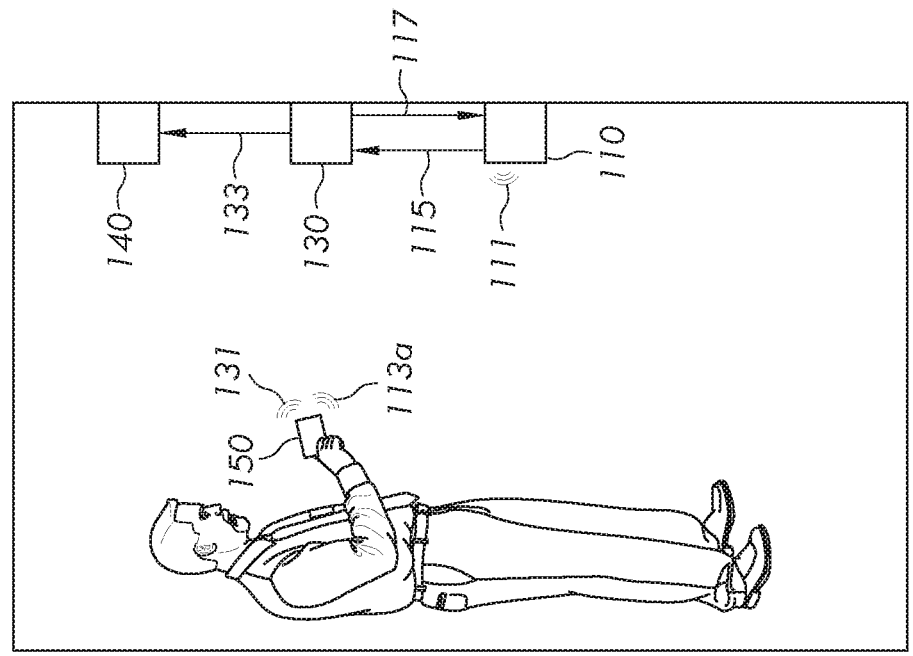

FIGS. 1*a-b* illustrate an exemplary access control system 100 including a credential detector 110, a credential reader 130, and an access device 140. As illustrated, system 100 is structured to grant or deny access to an interior room of a building. In other embodiments, system 100 is structured to grant or deny access to a building or other secured area.

Credential detector 110 is configured to transmit an interrogation signal 111 and receive a "reflected" interrogation signal 113*a*, 113*b*. The interrogation signal 111 includes a ping or series of pings. The length of each ping, in different embodiments, varies to decrease signal noise. The interrogation signal 111, in different embodiments, is inverted to reduce signal noise. As used herein, the term "reflected" is used to indicate that the interrogation signal is being modified and returned to the credential detector, either having the same format or having a modified format. In one system known as a passive system, the detector 110 transmits an RF signal that is modified by the credential 150 through load modulation. In an active system, the credential 150 generates its own RF field to transmit responses to the commands provided by the credential 150.

As illustrated in FIG. 1*a*, the reflected interrogated signal 113*a* may be affected by the presence of a credential 150 or, as illustrated in FIG. 1*b*, the reflected interrogated signal 113*b* may not be affected by the presence of an RF credential 150. Regardless of the presence of the RF credential 150, the reflected interrogation signal may be affected by other factors such as changes in temperature.

The electrical characteristics of the reflected interrogation signal 113*a*, 113*b*, are received by the credential detector 110 and compared to threshold values determined by an initial calibration of the credential detector 110. The credential detector 110 is structured to transmit a reader activation signal 115 to the credential reader 130 in response to a determination that the electrical characteristics of the reflected interrogation signal 113, 113b exceed the threshold values.

The credential reader 130 is structured to activate and receive credential data 131 from credential 150 in response to receiving the activation signal 115. With respect to FIG. 1a, the credential reader 130 either grants or denies access to the secured area in response to receiving the credential data 131 by transmitting an access device activation signal 133 to access device 140. With respect to FIG. 1b, the credential reader 130 is structured to transmit a false detect signal 117 to the credential detector 110 in response to the credential reader not detecting a credential 150.

Figure 2:
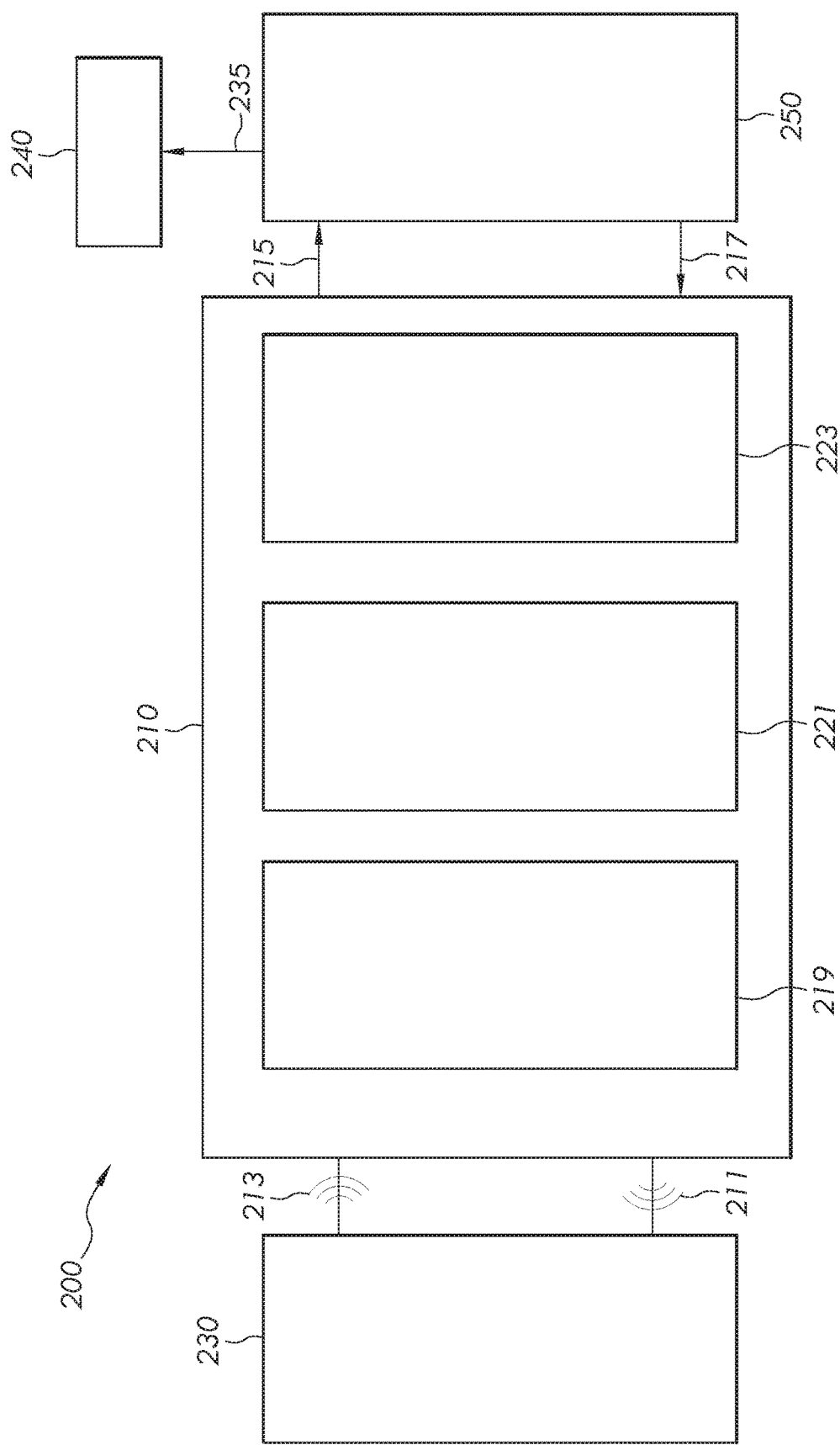
FIG. 2 is a block diagram of another exemplary access control system.

Referring to FIG. 2, there is illustrated another exemplary access control system 200. The system 200 includes a credential detector 210, a credential reader 230, and an access device 240. Credential detector 210 includes an antenna 219, a processing device 221, and a memory device 223. The antenna 219 is structured to generate an interrogation signal 211 and to receive a reflected interrogation signal 213. Memory device 223 is structured to store and retrieve data including electrical characteristics of interrogation signals. Processing device 221 is structured to receive the reflected interrogation signal 213 from antenna 219.

The credential reader 230 is in electrical communication with credential detector 210. Credential reader 230 is structured to look for a credential 250 in response to receiving an activation signal 215 from credential detector 210. Credential reader 230 is additionally structured to transmit a false detect signal 217 to credential detector 210 in response to failing to detect a credential 250 after receiving an activation signal 215. In response to receiving credential data 233 from the credential 250, credential reader 230 is structured to generate an external device activation signal 235 in response to positively verifying the credential 250.

Figure 3:
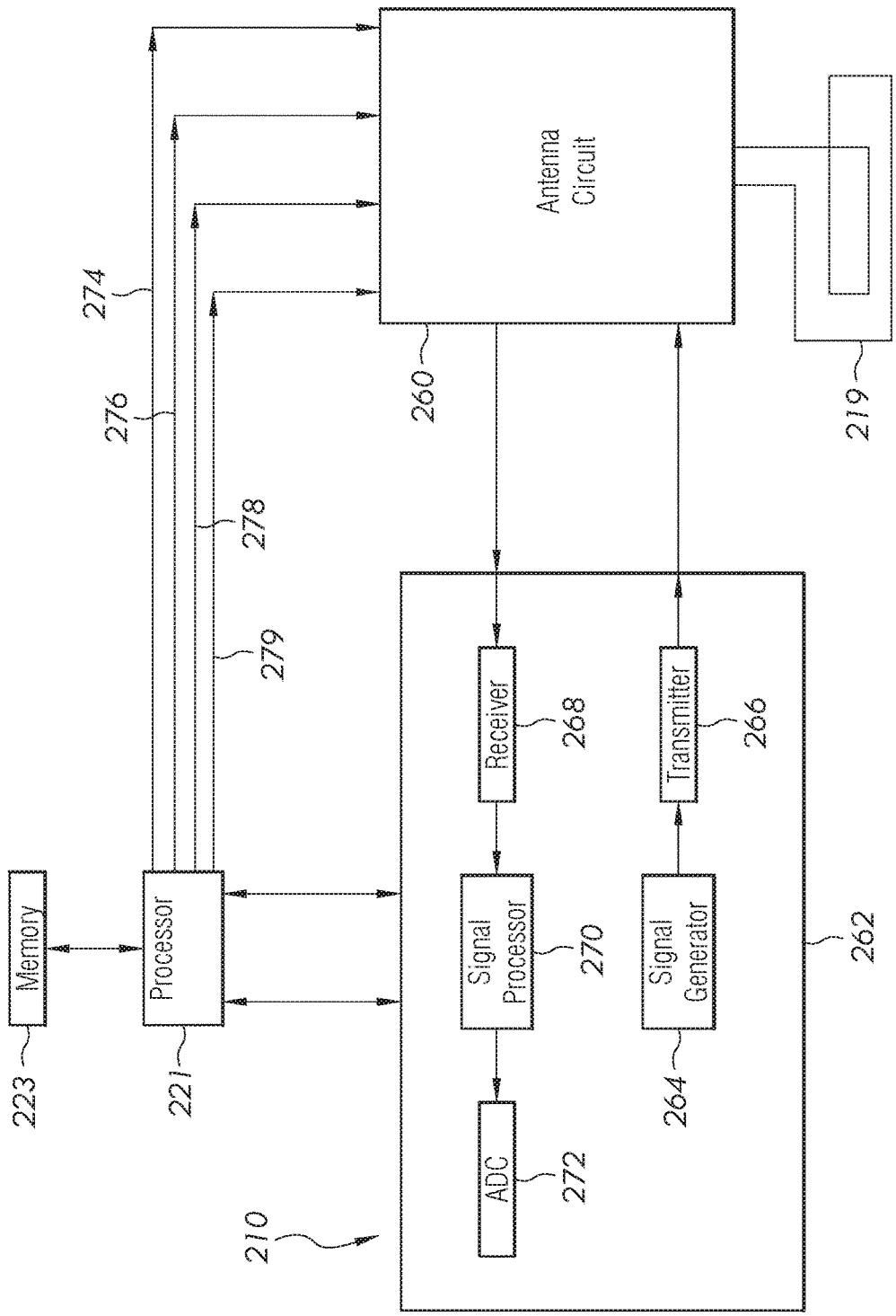
FIG. 3 is a block diagram of a credential detector.

In FIG. 3, the credential detector 210, which includes the antenna 219, the processing device 221, and the memory 223, is further illustrated to include an antenna circuit 260, disposed between the antenna 219 and the processor 221, and a signal conditioning circuit 262 operatively connected to the antenna circuit 260 and to the processor 221. The signal conditioning circuit 262 includes a signal generator 264 configured to generate the interrogation signal which is transmitted by a transmitter 266 operatively connected to the antenna circuit 260. As described above, the interrogation signal in one embodiment is a "ping" signal which is ultimately transmitted from the detector 210 by the antenna 219. In some embodiments, the credential reader 230 and the credential detector 210 share the same processor, while in other embodiments, the credential reader 230 and the credential detector incorporate different processors.

In one embodiment, the interrogation signal includes a signal of 13.56 Megahertz, transmitted generally about five (5) to eight (8) times a second. The antenna circuit 260 returns a signal to a receiver 268 which is in turn processed by a signal processor 270. The signal processor 270 processes a signal which is an interrogation signal transmitted back into the receiver 268. This signal is one of: the same as the signal transmitted by the transmitter 266; a signal that has been modified by the presence of a credential; or a signal that has been modified by something other than the credential. When the signal is modified by something other than the credential 250, the received signal is considered to be a "false detect" signal.

The signal provided by the signal processor 270 is demodulated and is provided to an analog to digital converter (ADC) 272. The demodulated signal includes an amplitude and phase which is converted by the ADC 272 to quadrature signals, also known as I and Q signals. The I and Q signals include information regarding signal modulation changes, changes which are provided when a credential is appropriately located with respect to the detector 210. The ADC 272 provides digital values of each of the I and Q values to the processor 221 which determines, in part, whether the provided I and Q values represent the presence of a credential or an instance of a false detect.

In one embodiment, a CLRC663 integrated circuit chip available from NXP Semiconductor of Eindhoven, Netherlands, provides the detector 210. This integrated circuit chip provides a low power credential detection (LPCD) which repeatedly energizes the antenna with the interrogation signal for a selectable amount of time in the microsecond (µs) range. While the antenna is energized, the CLRC663 firmware performs an operation that returns the two values, of the in-phase and the quadrature-phase signals (I and Q), which are affected by the proximity of a credential or other material to the antenna. These digital values range from hex 00-3F, and are a representation of the antenna impedance, which is altered by the presence of a credential or other materials. Each energizing pulse "ping" identifies the received I and Q values. While one embodiment incorporates the CLRC663 integrated circuit, other embodiments include other integrated circuits configured to modulate and demodulate RF signals and to provide I and Q digital values of the demodulated RF signals. In still other embodiments, the detector 210 is configured to include integrated circuits, discrete components, and combinations of the two.

The received I and Q are transmitted to the processor 221, which is configured to adjust the impedance of the antenna circuit 260 as a function of the received I and Q values. The processor 221, in different embodiments, is a programmable type, a dedicated, hardwired state machine, or a combination of each, and in other embodiments includes multiple processors, Arithmetic-Logic Units (ALUs), Central Processing Units (CPUs), Digital Signal Processors (DSPs) or the like. Other forms of processor 221 include multiple processing units, distributed, pipelined, and/or parallel processing. The processor 221 may be dedicated to performance of the operations described herein or may be utilized in one or more additional applications. In the depicted form, the processor 221 is of a programmable variety that executes algorithms and processes data in accordance with defined by programmed instructions (such as software or firmware) stored in the memory 223. Alternatively or additionally, the operating logic for processor 221 is at least partially defined by hardwired logic or other hardware. The processor 221, in different embodiments, is comprised of one or more components of any type suitable to process the signals received from input/output devices, and provide desired output signals. Such components may include digital circuitry, analog circuitry, or a combination of both.

The memory 223 includes one or more types, such as a solid-state variety, electromagnetic variety, optical variety, or a combination of these forms. Furthermore, the memory 223 includes, in different embodiments, volatile, nonvolatile, or a combination of these types, and a portable variety, such as a disk, tape, memory stick, cartridge, or the like. In addition, the memory 223 is configured to store data that is manipulated by the operating logic of the processor 221, such as data representative of signals received and/or sent in addition to or in lieu of stored program instructions, just to name one example.

Figure 4:
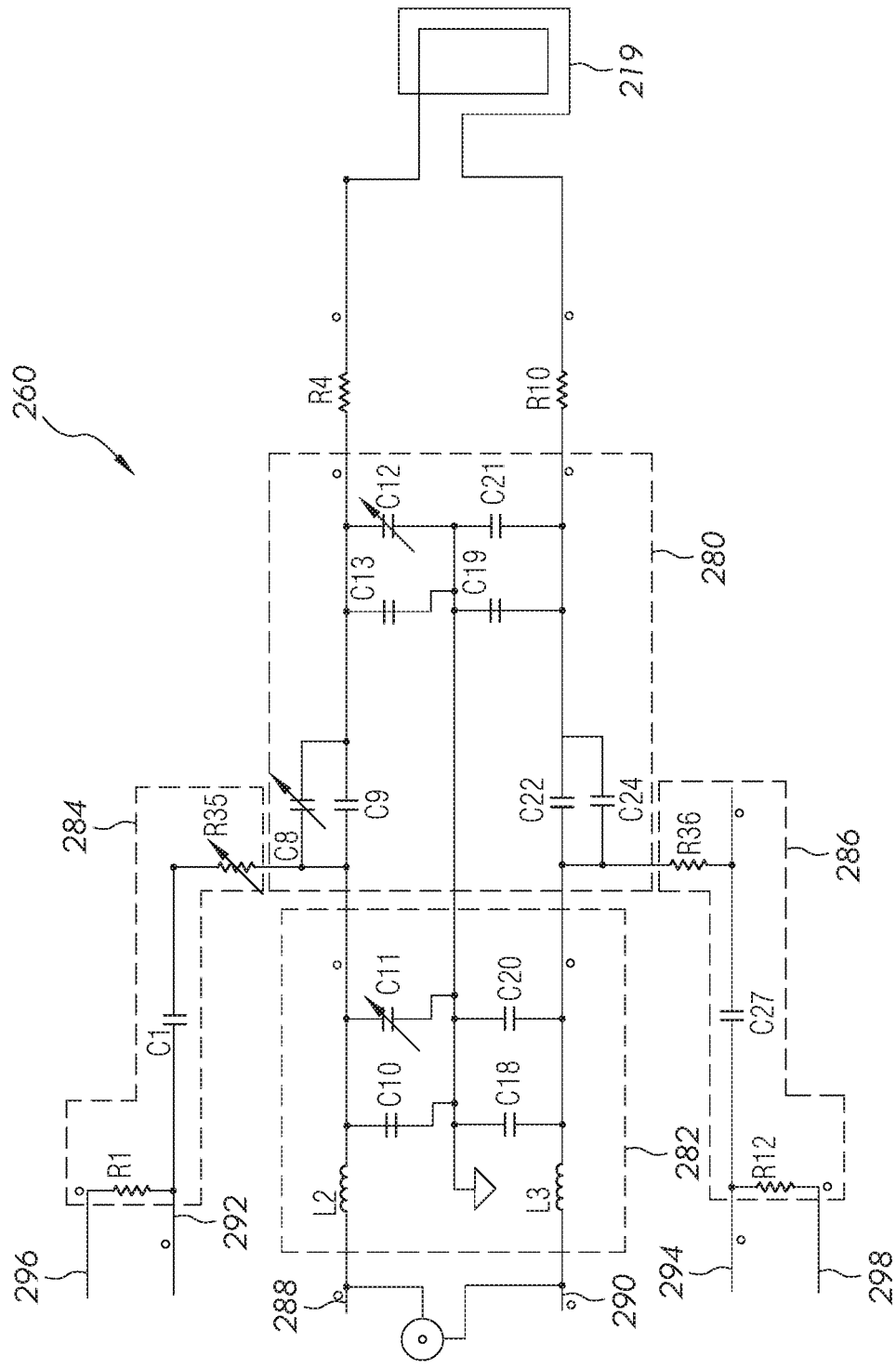
FIG. 4 is a circuit schematic of an antenna circuit including an antenna.

The processor includes a first output 274, a second output 276, a third output 278, and a fourth output 279, each of which is operatively connected to the antenna circuit 260 and as further illustrated in FIG. 4. In different embodiments, any one of the outputs is used to adjust antenna impedance. Other inputs and outputs of the processor are provided as is known by those skilled in the art.

When a "ping" transmitted by the transmitter 266 returns values outside a selectable range from those read on a previous "ping", an interrupt signal is sent out from the signal conditioning circuit 262 which, in different embodiments, is used to initiate subsequent processes on external devices. When using for instance the CLRC663, the antenna is energized at a supply voltage minus approximately 1 volt for each "ping", and when a "ping" is detected such that an interrupt signal is sent from the signal conditioning circuit 262 to the processor 221. This voltage is established to minimize the power consumed by the antenna when being energized. The antenna is then energized to read a credential at a selectable voltage. In one embodiment, the CLRC663 chip generates a voltage about 1 volt for a credential read, so that the antenna can use the maximum power on each "ping" without exceeding any component power limits on a credential read. The example code used by the CLRC663 chip and provided by NXP Semiconductor provides basic control of the I and Q settings by supplying a single variable that can be adjusted to set the range for I and Q at the values read during initial calibration±x. This calibration occurs once, using a predetermined value of x, and then is never updated again.

The I and Q values stored on the CLRC663 are analog to digital conversions (ADC), which can cause low power credential detection jitter when one of the analog values falls between bits of the ADC after conversion. Consequently, the CLRC663 as provided by the example code can suffer from an excessive number of false detections due to the detection jitter when no object is actually detuning the antenna. For example, if the analog value for Q would be read at 08.5, the ADC would interpret the value as either 08 or 09 when making a digital conversion. On a subsequent LPCD "ping", the digital conversion could be rounded in the opposite direction causing an interrupt signal to be sent out from the CLRC663 even though no object was detuning the antenna. False detections pose a problem for battery operated products because they can significantly reduce battery life when a product repeatedly and unnecessarily expends energy attempting to perform interrupt-based tasks.

The example code provided by NXP Semiconductor provides basic control of the I and Q settings by supplying a single variable that can be adjusted to set range for I and Q at the values read during initial calibration±x; the larger x becomes, the less sensitive the antenna becomes, with zero being the most sensitive. Increasing the value of x can quickly cause excessive desensitizing, due to each increment of x adding two values to the accepted I and Q ranges; one at the high end of the range, and one at the low end of the range, with both I and Q ranges linked to the same variable. An antenna detuned in this way would have fewer false-detects, but would decrease the range at which a valid detection could occur.

A product using an approach based on the NXP Semiconductor example code also fails to account for fluctuations in temperature (which can change the I and Q values returned with each "ping" when large enough), and for variation between parts such as discrete electrical components, printed circuit boards, enclosures, spacing during assembly, etc. (which can all change the I and Q values returned with each "ping").

Because false detections can result from component tolerances, component aging, escutcheon variations, and temperature variations, the I and Q thresholds are increased to eliminate the false detections. Too many false detections reduce battery life, but increasing the thresholds of acceptable I and Q values reduces the detect range of the reader.

As further illustrated in FIG. 4, the antenna circuit 260, which is coupled to the antenna 219, is configured to adjust the impedance of the antenna 219. To reduce or eliminate false detections, the antenna impedance is adjusted slightly, rather than by widening the I and/or Q thresholds. In addition, the adjustment of the antenna impedance maintains the card detect sensitivity at a maximum, rather than reducing sensitivity which occurs when the I and/or Q thresholds are widened.

The antenna circuit 260 includes a first antenna matching circuit 280, a second antenna matching circuit 282, a first level adjusting network 284, and a second level adjusting network 286. The first and second level adjusting networks 284 and 286 are also known as feedback resistor networks. The feedback resistor network 284 includes the components R1, C1, and R35. The signal conditioning circuit 262 is coupled to a first interrogation signal node 288 and a second interrogation signal node 290. The interrogation signal nodes 288 and 290 receive the interrogation signal provided by the signal conditioning circuit 262, which is transmitted through the second antenna matching circuit 282 and the first antenna matching circuit 280 to the antenna 219. Both the nodes 288 and 290 receive a signal to drive the antenna.

The antenna circuit 260 also provides to the receiver 268 of the signal conditioning circuit 262 a credential signal of the credential 150. The antenna circuit 260 includes a first output 296 and a second output 298, each of which is coupled to the signal conditioning circuit 262. A first voltage reference 292 and a second voltage reference 294 are provided at the first line 292 and the second line 294, respectively. The voltage at the references 292 and 294 is provided, in different embodiments, by the signal conditioning circuit 262 or by other voltage supplies. Both of the outputs 296 and 298 provide a signal from the antenna to the signal conditioning circuit 262.

The impedance of the antenna 219 is adjusted by one of, some of, or all of the first antenna matching circuit 280, the second antenna matching circuit 282, and the first level adjusting network 284. In another embodiment, the level adjusting network 286 is also used to adjust the impedance of the antenna 219.

By adjusting the antenna impedance instead of increasing the I and Q thresholds, the false detections are reduced or eliminated and the card detect range is kept at maximum. In one embodiment, a variable series/parallel capacitance is provided at one or both of the antenna matching circuits' capacitors 280 and 282. By adjusting the capacitance value, the antenna impedance can be adjusted to move the I value from an unstable value, for instance, of 10.5 to a stable value of 10 (or 11.) This prevents the circuit 262 from false detecting and keeps the I thresholds at the minimum, which in this example is Imin=10, Imax=10. For instance, a capacitor, C12, of the first antenna matching circuit 280, is a variable capacitor having a control input coupled to the first output 274 of the processor 221. A capacitor, C11, of the second matching circuit 282 is coupled to the second output 276 of the processor 221.

Once the circuit 262 is calibrated and starts detection, a false detect will return I and Q values. If, for example, the I value is jumping between 10 and 11, the variable parallel capacitance across one or both of the antenna matching capacitors C11 and C12 is slightly increased or decreased until the I value becomes stable on either 10 or 11 value. At this point, the false detections stop and the I threshold remains at the minimum of Imin=10, Imax=10 or Imin=11, Imax=11. In one embodiment, the variable capacitors C11 and C12 are each controlled separately via a different serial peripheral interface (SPI) bus from the processor 221. While the capacitors C11 and C12 are illustrated as being controllable to adjust the I and Q values, any of the other capacitors in the first and second antenna matching circuits 280 and 282 can be provided as variable capacitors to adjust the I and Q values.

Each of the variable capacitors C11 and C12 is embodied in one or more different types of variable capacitors. These embodiments include a digital capacitor Eval board from Peregrine Semiconductor Corporation of San Diego Calif., switching in and out discrete capacitors using an RF switch, and switching in a varactor as the parallel capacitor. The present disclosure is not limited, however, to these variable capacitors and other variable capacitors are included. The use of a digital capacitor provides a larger range of capacitance with several different capacitance values that can be set with fine resolution. The use of an RF switch capacitor is low cost. The varactor capacitor provides a very low current consumption.

In another embodiment, a resistor R35 of the feedback resistor network 284 of the RF section is configured to vary the voltage at the first voltage reference 296. Adjustment of R35 is provided by the third output 278 of the processor 221. By adjusting this resistor value, the resulting effect is one of adjusting the I and/or Q values. For example, an unstable I value of 10.5 is adjusted to a stable value of 10. This adjustment maximizes the detect range and reduces or eliminate false detects. This approach also has the added benefit of being able to set the voltage at the first voltage reference 296 to the optimum voltage level for voltage sensitivity by reading the voltage with an AD input on the processor 221. In one embodiment, the voltage is adjusted to the required level for optimum reading of the credential 150 and, at the same time, slightly adjusted to reduce or prevent false detections. In other embodiments, the R1 and the C1 components can be controllable components and used to adjust the I and the Q values. Additionally, the feedback resistor network 286, in other embodiments, includes each of, some of, or all of the components R12, R36, and C27 as adjustably controllable components to adjust the I and Q values.

In one embodiment, a variable series or parallel resistor in the resistor feedback to the first voltage reference 296 adjusts the voltage to 1.65 V or another optimum setting by adjusting the variable resistor and monitoring the voltage at the processor 221 AD input. If the I or Q value is unstable and false detecting occurs, the variable resistor R35 is adjusted up or down slightly until the false detections stop. Again, for example, the I value threshold could be set to Imin=10, Imax=10. In one embodiment, the resistor R35 is digital potentiometer controlled via SPI from the processor 221.

In another embodiment, the capacitor C8 of the first antenna matching circuit 280 is a variable capacitor to adjust the voltage at first voltage reference 296 by the fourth output 279 of the processor 221. In this and other embodiments, each of the resistor R35 and capacitor C8 operate singly or in combination. The capacitor C8, in different embodiments, is configured as the variable capacitors described above. In another embodiment, the second level adjusting network 286 is configured like the first level adjusting network.

Figure 5:
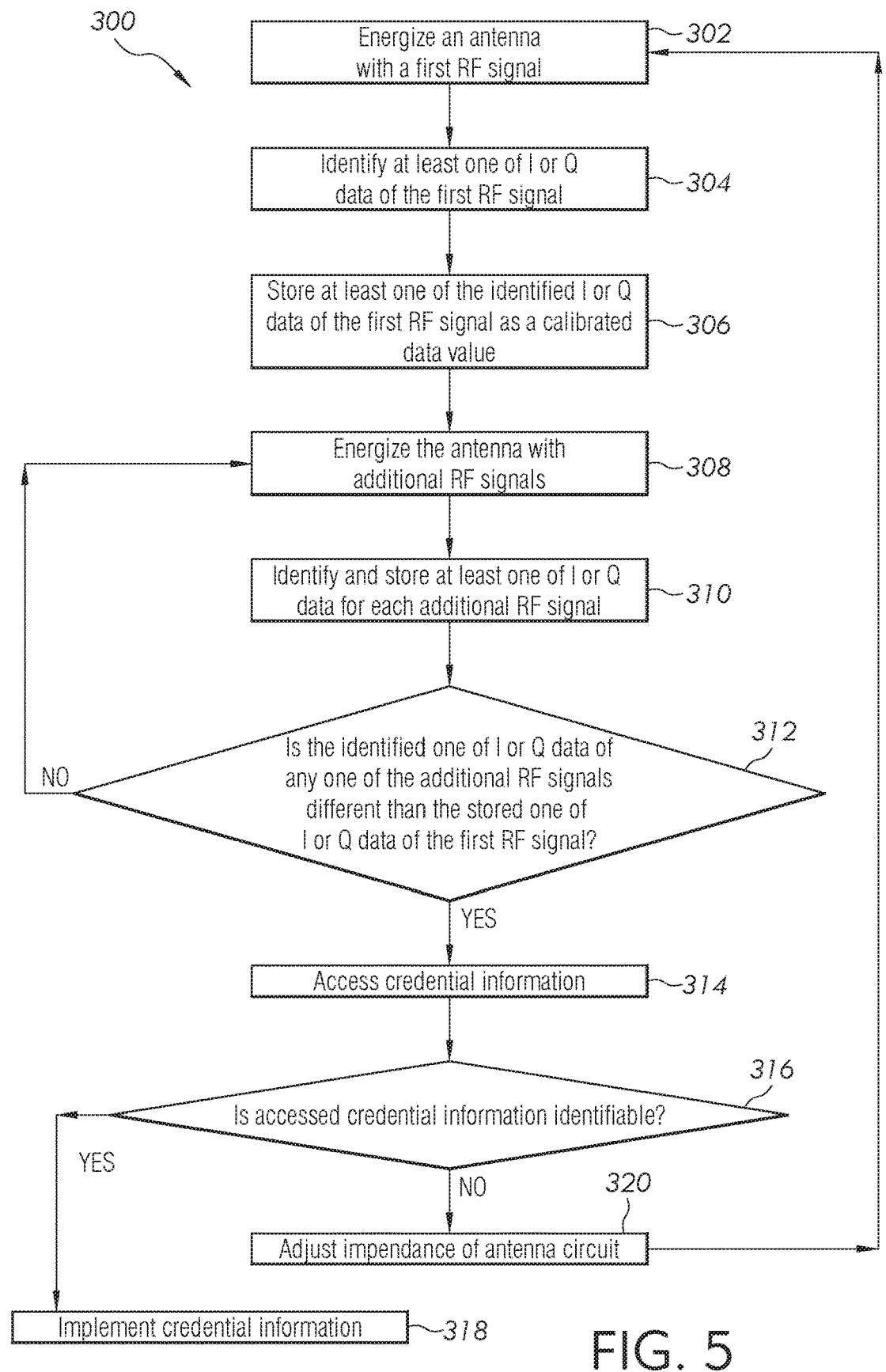
FIG. 5 is a block diagram of a process for adjusting of antenna impedance in an access control system to reduce the number of false detects.

FIG. 5 illustrates a process diagram 300 of one embodiment of adjusting of antenna impedance to reduce the number of false detects. At block 302, the antenna 219 is energized with a first RF signal. As described herein, the first RF signal is also identified as an interrogation signal or a "ping" signal. The antenna is energized with the first RF signal to identify a value of I, a value of Q, or both values of I and Q at block 304 of the "reflected" signal. In those instances where there is no credential present, the values of I and Q are generally the same as the signal being transmitted, unless some obstruction or temperature change is present. The identified values of I and/or Q are identified to establish baseline values of I and/or Q without the presence of a credential. Additionally, the values are determined in the environment where the lock device is installed such the values are consistent with a "normal" operation condition. Once identified, one of or both of the I and Q values are stored as calibrated data values at block 306. Once stored, the values are used as a calibrated baseline.

The antenna is then energized at block 308 with additional RF signals, generally transmitted about five 5 to 8 times a second. For each of the transmitted RF signals, the I and/or Q data values are identified and stored at block 310.

Each of the I and/or Q values is stored and compared to the baseline I and/or Q values stored at block 306. If any one of the additional I and Q values is different from the baseline I and/or Q values as determined at block 312, then an interrupt signal is transmitted to the processor 221 by the signal conditioning circuit 262. At this point, the processor 221 attempts to access and read information provided by a credential at block 314. At block 316, if the credential information is present and identifiable, the credential information is implemented at block 318. If, however, the information is not identifiable as determined at block 316, the impedance of the antenna 219 is adjusted at block 320. Once adjusted, the system energizes the antenna with another RF signal, here shown as the first RF signal at block 302. The identified values of the I and/or Q value are stored to use as the calibrated base line value for further comparison with additional RF signals as described.

Figure 6:
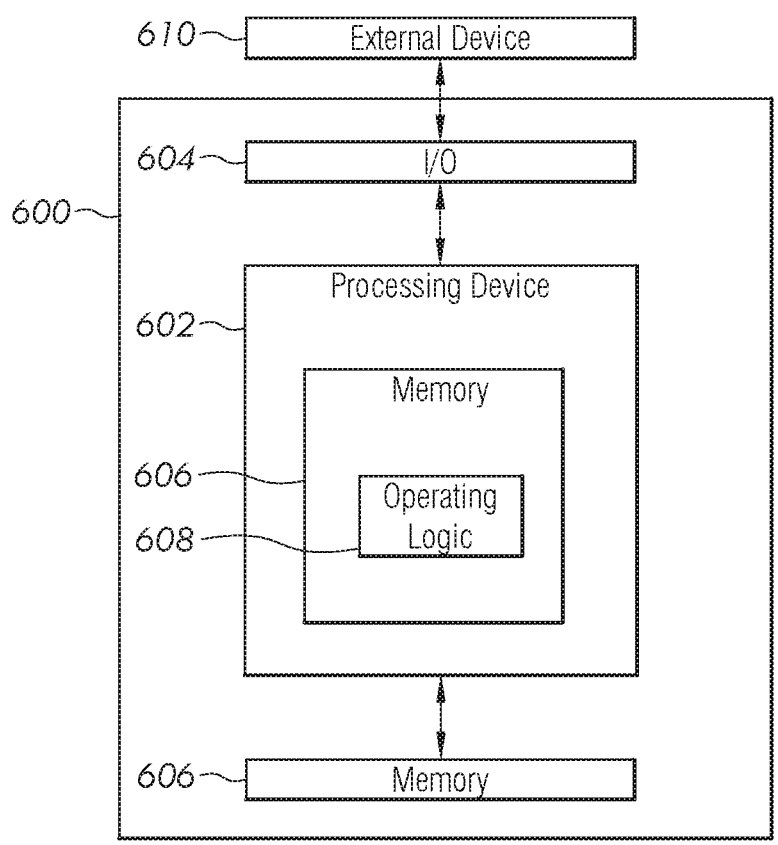
FIG. 6 is schematic block diagram of a computing device.

Referring to FIG. 6, there is illustrated a schematic block diagram of a computing device 600. The computing device 600 is one example of a computer, server, mobile device, reader device, or equipment configuration which is utilized, in different embodiments, in connection with the credential detector 110, credential reader 130, credential 150, or external device 140 shown in FIGS. 1a-b. The computing device 600 includes a processing device 602, an input/output device 604, memory 606, and operating logic 608. Furthermore, the computing device 600 communicates with one or more external devices 610.

The input/output device 604 enables the computing device 600 to communicate with the external device 610. For example, the input/output device 604 in different embodiments is a network adapter, network credential, interface, or a port (e.g., a USB port, serial port, parallel port, an analog port, a digital port, VGA, DVI, HDMI, FireWire, CAT 5, or any other type of port or interface). The input/output device 604 is comprised of hardware, software, and/or firmware. It is contemplated that the input/output device 604 includes more than one of these adapters, credentials, or ports.

The external device 610 in different embodiments is any type of device that allows data to be inputted or outputted from the computing device 600. For example, the external device 610 in different embodiments is a mobile device, a reader device, equipment, a handheld computer, a diagnostic tool, a controller, a computer, a server, a printer, a display, an alarm, an illuminated indicator such as a status indicator, a keyboard, a mouse, or a touch screen display. Furthermore, it is contemplated that the external device 610 is be integrated into the computing device 600. It is further contemplated that more than one external device is in communication with the computing device 600.

The processing device 602 in different embodiments is a programmable type, a dedicated, hardwired state machine, or a combination of these; and can further include multiple processors, Arithmetic-Logic Units (ALUs), Central Processing Units (CPUs), Digital Signal Processors (DSPs) or the like. For forms of processing device 602 with multiple processing units, distributed, pipelined, and/or parallel processing can be utilized as appropriate. The processing device 602 may be dedicated to performance of just the operations described herein or may be utilized in one or more additional applications. In the depicted form, the processing device 602 is of a programmable variety that executes processes and processes data in accordance with operating logic 608 as defined by programming instructions (such as software or firmware) stored in memory 606. Alternatively or additionally, the operating logic 608 for processing device 602 is at least partially defined by hardwired logic or other hardware. The processing device 602 can be comprised of one or more components of any type suitable to process the signals received from input/output device 604 or elsewhere, and provide desired output signals. Such components may include digital circuitry, analog circuitry, or a combination of both.

The memory 606 in different embodiments is of one or more types, such as a solid-state variety, electromagnetic variety, optical variety, or a combination of these forms. Furthermore, the memory 606 can be volatile, nonvolatile, or a combination of these types, and some or all of memory 606 can be of a portable variety, such as a disk, tape, memory stick, cartridge, or the like. In addition, the memory 606 can store data that is manipulated by the operating logic 608 of the processing device 602, such as data representative of signals received from and/or sent to the input/output device 604 in addition to or in lieu of storing programming instructions defining the operating logic 608, just to name one example. As shown in FIG. 6, the memory 606 is be included with the processing device 602 and/or coupled to the processing device 602.

The processes in the present application may be implemented in the operating logic 608 as operations by software, hardware, artificial intelligence, fuzzy logic, or any combination thereof, or at least partially performed by a user or operator. In certain embodiments, units represent software elements as a computer program encoded on a non-transitory computer readable medium, and the credential detector 110, credential reader 130, credential 150, or external device 140 performs the described operations when executing the computer program.

As disclosed herein, the impedance the antenna 219 is adjusted dynamically by switching in and out tuning components controlled by firmware. The firmware is resident in one of the processor 221, the memory 223, or other circuit device as understood by those skilled in the art. In addition, the first voltage reference 296 and second voltage reference 298 are adjustable to an optimum level by adjusting the resistors R35 and/or R36 as described herein. By doing this adjustment, known integrated circuit chips such as the NXP CLRC663 RFID chip can be optimized for low power card detection sensitivity and at the same time to eliminate false detections. In addition, the disclosed embodiments are equally applicable to customized circuit designs and applications.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of detecting the presence of a credential with a credential reader, the credential reader including an antenna circuit having an antenna to transmit and to receive a signal, the method comprising:
   transmitting an energizing signal with the antenna;
   receiving a modified energizing signal with the antenna;
   demodulating the received modified energizing signal to determine one or more modified values of the received modified energizing signal; and
   adjusting a component of the antenna circuit as a function of the one or more modified values.

2. The method of claim 1, further comprising determining a digital value of the one or more modified values.

3. The method of claim 1, wherein the transmitting the energizing signal includes transmitting a plurality of energizing signals with the antenna; and
   wherein receiving the modified energizing signal includes receiving a plurality of modified energizing signals.

4. The method of claim 3, wherein the demodulating the received modified energizing signal includes demodulating each of the plurality of received modified energizing signals to determine a digital value of the one or more modified values for each of the demodulated plurality of received modified energizing signals.

5. The method of claim 4, further comprising comparing the digital values of the one or more modified values of a first one of the plurality demodulated modified energizing signals to a second one of the plurality of demodulated modified energizing signals to determine a difference in value.

6. The method of claim 2, wherein the demodulating the received modified energizing signal comprises demodulating a first energizing signal; and further comprising:
   transmitting a second energizing signal with the antenna; and
   demodulating the second energizing signal to determine a digital value of the one or more modified values of the demodulated second energizing signal.

7. The method of claim 6, further comprising:
   setting a calibration value of the one or more modified values equal to the digital value of the one or more modified values of the demodulated first energizing signal;

determining whether the digital value of the one or more modified values of the demodulated second energizing signal is different than the calibration value;

accessing credential information of the credential in response to determining the digital value of the one or more modified values of the demodulated second energy signal is different than the calibration value; and determining if the accessed credential information indicates a false detect.

8. The method of claim 7, wherein the adjusting the component of the antenna circuit as a function of the one or more modified values includes adjusting a component if the accessed credential information indicates a false detect.

9. The method of claim 7, further comprising transmitting an interrupt signal if the digital value of the one or more modified values of the demodulated second energizing signal is different than the calibration value.

10. The method of claim 9, wherein the adjusting the component of the antenna circuit using the one or more modified values includes adjusting a component if the determined modified interrupt signal is a false detect.

11. The method of claim 7, wherein the adjusting the component of the antenna circuit includes adjusting one of a resistance of a resistor and a capacitance of a capacitor of the antenna circuit.

12. The method of claim 11, wherein adjusting the component of the antenna circuit includes:
transmitting the one or more modified values to a processor;
determining, at the processor, an adjustment value as a function of the transmitted one or more modified values; and
adjusting the resistance or the capacitance using the determined adjustment value.

13. An access control device, comprising:
a credential reader and detection circuit structured to enter a standby mode, awaken from the standby mode, and receive data from a credential, the credential reader and detection circuit including:
a memory configured to store program instructions;
an antenna circuit; and
a processor electrically coupled to the antenna circuit and to the credential reader and detection circuit, the processor configured to execute the stored program instructions to:
transmit an energizing signal;
receive a modulated energizing signal;
transmit an interrupt signal in response to the received modulated energizing signal;
receive a false detection signal; and
adjust an impedance of the antenna circuit in response to the received false detection signal.

14. The device of claim 13, wherein the processor is further configured to execute stored program instructions to:
transmit a plurality of energizing signals;
receive a plurality of modulated energizing signals;
determine a modulated value for each of the received plurality of modulated energizing signals; and
store one of the determined value of the modulated value as a first calibration value.

15. The device of claim 14, wherein the processor is further configured to execute stored program instructions to:
determine whether the calibration value is different than or the same as one of the modulated values of each of the other modulated energizing signals; and
generate an interrupt signal if the calibration value is different than one of the modulated values of each of the other modulated energizing signals.

16. The device of claim 15, wherein the processor is further configured to execute stored program instructions to:
access credential data upon generation of the interrupt signal; and
determine whether the accessed credential information indicates a false detect.

17. The device of claim 16, wherein the calibration value is a first calibration value, and wherein the processor is further configured to execute stored program instructions to:
change the first calibration value to a second calibration value if the first calibration value is different than the modulation value of one of the modulated energizing signals and the accessed credential information indicates a false detect.

18. The device of claim 13, wherein the processor is further configured to execute stored program instructions to:
adjust the impedance of the antenna circuit by adjusting one of a resistance of a resistor and a capacitance of a capacitor of the antenna circuit.

19. The device of claim 18, wherein the processor is further configured to execute stored program instructions to:
determine, at the processor, an adjustment value as a function of the modulated value of the received modulated energizing signal.

20. The device of claim 19, wherein the processor is further configured to execute stored program instructions to:
adjust the resistance or the capacitance using the determined adjustment value.

* * * * *